Patented Apr. 2, 1940

2,195,469

UNITED STATES PATENT OFFICE 2,195,469

PROCESS FOR THE TREATMENT OF LIQUID OR SEMISOLID FOODS AND FOODSTUFFS

Karl Richter, Kiel, Germany, assignor, by mesne assignments, to Metra Maatschappij voor Verduurzaming van Zuivelproducten N. V., a limited company, Amsterdam, Netherlands, incorporated in the Kingdom of the Netherlands No Drawing. Application September 16, 1936, Serial No. 101,085. In the Netherlands August 17, 1936

10 Claims. (Cl. 79—213)

This invention relates to a process for the treatment of liquid and semisolid foods and foodstuffs with the object of preserving them or keeping them in good condition. The invention relates more especially to the preservation of dairy products.

In German Patent No. 613,707 it has been proposed to preserve, or keep fresh, liquid dairy products by freeing them from gases at a low temperature, about 10° C. by adding oxygen under a pressure of 8–10 atmospheres, and maintaining this oxygen pressure. The substances so treated had however to be stored at temperatures below about 12° C. if they were to be preserved for a long time. This condition forms an economic drawback in a process which is otherwise satisfactory, because the production and maintenance of a low temperature of course entails expense and labour, especially if the products shall be kept long in storage in hot climates. Attempts have therefore been made to preserve milk and the like by co-operation of heat and oxygen under pressure, but these attempts do not seem to have been successful, as only disadvantages of the process are reported. My efforts to effect a complete destruction of the non-sporogeneous bacteria, in order in this way to produce a preservation of the milk at all temperatures were successful when the initial material while under oxygen pressure was freed from the gases dissolved therein, preferably by forcing into it from below oxygen under pressure and heating the material, thus freed from the gases and saturated with oxygen, to a temperature not exceeding 80° C., and preferably to a temperature ranging between about 50 and 60° C., in an atmosphere of oxygen under a pressure ranging between 5 and 20 atmospheres. I have found that when treating milk or some other liquid or semi-liquid foodstuff in the manner herebefore described, the material thus treated can be stored, without artificial cooling, under all atmospheric conditions, even in summer and in tropical climates, for several weeks without any deterioration.

This result is due to a combination of steps which I have found to be of paramount importance in the preservation of foodstuffs and more particularly milk.

The presence, in milk for instance, of gases dissolved and developed therein, is deleterious to preservation in that these gases not only impart to the milk a taste and flavor, which are disagreeable to many persons, but also create an atmosphere in which the aerobic as well as the anaerobic bacteria and their spores can live and develop and will, in the course of time, cause the milk to become acid and even unfit for consumption. The presence of such gases prevents the oxygen, which acts as a protective agent, from coming into intimate contact with all particles of the milk and with the bacteria and spores contained therein. Now it is of paramount importance that such intimate contact between the oxygen and the milk be brought about, since both the aerobic and anaerobic bacteria cannot live in contact with undiluted oxygen and when the milk is heated their spores are prevented by the presence of oxygen from developing. The same is true of the pathogenic bacteria which may be present in the milk and which do not form any spores. It is therefore of the utmost importance that the milk is and remains saturated throughout with undiluted oxygen. Obviously this can be obtained only, if the air and other gases dissolved in the milk are replaced by oxygen and if the milk is stored in an atmosphere of undiluted oxygen during storage.

In order that the destruction or paralyzation of all undesirable micro-organisms in the milk be attained quickly, the milk is heated, while in contact with oxygen under pressure, however in view of the fact, that all gases dissolved in the milk have previously been replaced by oxygen, I am enabled to limit the temperature required for such destruction or paralyzation to the extent of preserving all the favorable properties of raw milk. As is well known, sterilization, i. e., the killing of all micro-organisms, requires heating up to 120° C. Mere pasteurization, which renders the milk stable for about 24 hours, still requires heating to a temperature above 70° and as a rule up to 85–95° C. By saturating the milk with oxygen, undiluted by other gases, I am enabled to altogether kill the aerobic and anaerobic bacteria and to prevent further growth of their spores at temperatures below 70° C. and in the great majority of cases not exceeding 50–60° C.

Since at temperatures begining at about 60° C. a decomposition of the milk, however slight, sets in, the circumstance that according to this invention a temperature of 55 to 60° C. need as a rule not be overstepped, leads to the full preservation, in the stabilized milk, of all the favorable properties of raw milk. At the same time the removal of the gases contained in the raw milk also removes the undesirable taste and odor characteristic of many kinds of milk, so that the milk, if treated in accordance with this invention, possesses all the favorable properties of the raw milk, while lacking its unfavorable properties.

Milk, treated in accordance with this invention, will lack altogether the bitter taste resulting from beginning acidity. It will keep fresh for weeks under any conditions of temperature and climate without requiring artificial cooling. In view of this circumstance the present invention is a great improvement on the process disclosed in the German patent aforesaid since it includes a saving of the high costs of artificial cooling of the milk before and after treatment.

What has been said here with regard to milk, applies with equal force to other liquid and semi-liquid substances in which gases are dissolved and micro-organisms are present.

According to the present invention, the initial material such as for instance milk is heated in a pressure vessel for some hours to a temperature ranging between about 40-80° C. in an atmosphere of oxygen under a pressure of for instance 5-20 and preferably about 8 to 10 atmospheres, and thereupon stored at ordinary temperature under oxygen pressure. Exhaustive practical investigations have shown that the milk or other foodstuff, which in accordance with the present invention is submitted for periods up to several hours to a heat-treatment of 50-65° C. under an oxygen pressure of say 10 atm. showed a surprisingly greater destruction of bacteria than when treated by known processes. It has been found that by the maintenance of the oxygen pressure the possibility of development of any micro-organisms still present is removed. It is therefore no longer necessary to maintain low temperatures during the storage in the case of products treated by the present invention. The new process on the contrary enables the treated milk to be stored as long as desired at room temperature, even in summer and in hot climates.

The present invention is based upon the discovery, which is unexpected in view of the trend of the prior art in this field, that to obtain a preserving action it is not necessary to operate at low temperatures or at temperatures above 70° C., but that the preservation is more perfect, independently from the temperature of the outer air, if milk or another foodstuff, after having been freed from the gases dissolved therein and saturated altogether with oxygen, is heated in an atmosphere of oxygen under a pressure of for instance 8 to 10 atmospheres to a moderate temperature ranging between about 50 and 65° C.

Further researches have shown that in an oxygen atmosphere under a pressure of 5 to 20 atmospheres the effect of the heat on the micro-organisms depends to a certain extent on the nutrient content of the starting material, and that it is advisable, when the nutrient concentration is high, to employ a higher pressure, and/or higher temperatures, and/or longer periods of treatment, than with initial materials poorer in nutrient. In all cases, however, the temperatures to be employed are substantially lower than the temperatures otherwise necessary for sterilization, so that the undesirable consequences of the effects of high temperatures on milk or the like are avoided.

A special advantage of the process according to the invention for example for dairy products is that it is a valuable substitute for the pasteurizing step otherwise adopted.

*Example 1*

50 kg. meat broth are introduced into a pressure resistive container, and the gases present in the liquid are expelled by forcing oxygen into the liquid and thus replacing these gases by oxygen. The pressure action on the oxygen is then increased to about 10 atm., and the broth heated in the oxygen atmosphere under this pressure to about 50° C. for 4-8 hours. The container with its content is then allowed to cool down while maintaining the oxygen pressure. The content is now fit to be stored for weeks without deterioration.

*Example 2*

100 kg. whole milk, which are heated to 58-60° C. are filled into a pressure resistive vessel. Oxygen is then forced into the milk from below to remove any gases present. After passing oxygen through for a short time an oxygen pressure of about 10 atm. is established in and above the milk. The vessel is then heated up to 58-60° C. and thereupon kept at this temperature for from 4-8 hours. Then, while maintaining the oxygen atmosphere under a pressure of about 8-12 atm. the vessel is cooled in a suitable way. The milk in the vessel is now practically stable. The milk thus treated offers the advantage, as compared with pasteurized or sterilized milk, that it does not display the boiling flavor, and that the genuine albuminous substances are not detrimentally affected so that its nutritive value and its digestibility are practically unaltered, while the taste and flavor are improved owing to the removal of the gases originally dissolved in the raw milk.

*Example 3*

25 kg. evaporated or condensed milk having a content of 18% fatty dry substance are filled into a pressure container at 65° C. and as in Example 1 or 2 are freed from the dissolved gases by bubbling oxygen through. A pressure of about 10 atm. is then set up in the oxygen in the container which is now heated for 4-8 hours to 65° C. The milk in the container is allowed to cool down, or is cooled with the aid of a cooling medium, while being permanently acted upon by oxygen under pressure. The product can be stored at ordinary temperature, for instance at 20-35° C. and keeps good for a long time.

I prefer heating the initial material to 50 to 60° C. for 4 to 8 hours with the oxygen held under a pressure of 10-12 atmospheres. Oxygen in the usual commercial form may be employed.

The terms "saturate" and "saturation" used in the claims are to be understood as including a content of oxygen such as storable therein at ordinary temperature under any pressure above normal.

Various changes may be made in the details disclosed in the foregoing specification without departing from the invention or sacrificing the advantages thereof.

I claim:

1. The process of treating milk or other liquid or semi-liquid food material for preservation, which comprises freeing the material to be preserved from the gases dissolved therein, replacing these gases by oxygen, heating the material thus pretreated for that period of some hours sufficient to effect complete destruction of pathogenic organisms and substantially complete sterilization in an oxygen atmosphere under a pressure ranging between 5 and 20 atmospheres above normal to a temperature not exceeding 80° C., allowing the material to cool down and storing same, while keeping up saturation with oxygen.

2. The process of treating milk or other liquid or semi-liquid food material for preservation, which comprises forcing oxygen from below into and through a body of the material to be preserved in order to free said material from the gases dissolved therein, and to saturate it with oxygen substantially undiluted with other gases, heating the material thus pretreated for that period of some hours sufficient to effect complete destruction of pathogenic organisms and substantially complete sterilization in an oxygen atmosphere under a pressure ranging between 5 and 20 atmospheres above normal to a temperature not exceeding 80° C., allowing the material to cool down and storing same in an oxygen atmosphere under a pressure sufficing to keep up saturation with oxygen.

3. The process of treating milk or other liquid or semi-liquid food material for preservation, which comprises heating the material to be preserved to a temperature not exceeding 80° C., forcing oxygen from below into the body of material thus heated in order to free same from the gases dissolved therein, and to saturate it with oxygen, substantially undiluted with other gases, continuing the heating for that period of some hours sufficient to effect complete destruction of pathogenic organisms and substantially complete sterilization while building up in and above the gas an oxygen atmosphere under a pressure ranging between 5 and 20 atmospheres, allowing the material to cool down and storing same in a state of saturation with oxygen.

4. The process of treating milk or other liquid or semi-liquid food material for preservation, which comprises forcing from below into the material, heated to a temperature not exceeding 80° C., oxygen to free the material from the gases dissolved therein, and to saturate it with oxygen substantially undiluted with other gases, continuing the heating for that period of some hours sufficient to effect complete destruction of pathogenic organisms and substantially complete sterilization in an oxygen atmosphere ranging between 5 and 20 atmospheres, allowing the material to cool down and storing same under conditions, where it is saturated with oxygen.

5. The process of treating milk or other liquid or semi-liquid food material for preservation, which comprises forcing from below into the material, heated to a temperature ranging between 40 and 80° C., oxygen to free the material from the gases dissolved therein, and to replace them by oxygen, continuing the heating for that period of some hours sufficient to effect complete destruction of pathogenic organisms and substantially complete sterilization in an oxygen atmosphere ranging between 5 and 20 atmospheres, allowing the material to cool down and storing same in an atmosphere of compressed oxygen.

6. The process of treating milk or other liquid or semi-liquid food material for preservation, which comprises forcing from below into the material, heated to a temperature ranging between about 50 and 65° C., oxygen to free the material from the gases dissolved therein, and to replace such gases by oxygen substantially undiluted with other gases, continuing the heating for that period of some hours sufficient to effect complete destruction of pathogenic organisms and substantially complete sterilization in an oxygen atmosphere ranging between 5 and 20 atmospheres, allowing the material to cool down and storing same in an atmosphere of oxygen under pressure.

7. The process of treating milk or other liquid or semi-liquid food material for preservation, which comprises freeing the material to be preserved from the gases dissolved therein by replacing these gases by oxygen, heating the material, thus impregnated with substantially undiluted oxygen during 4 to 8 hours in an atmosphere of oxygen under a pressure ranging between 5 and 20 atmospheres above normal to a temperature between about 50 and 65° C., allowing the material to cool down and storing same under conditions of substantially permanent saturation with oxygen.

8. The process of treating milk or other liquid or semi-liquid food material for preservation, which comprises forcing from below into the material, heated to a temperature not exceeding 80° C., oxygen to replace substantially the whole of the gases dissolved therein by oxygen, continuing the heating 4 to 8 hours in an oxygen atmosphere under a pressure ranging between 8 and 10 atmospheres, allowing the material to cool down and storing same in an atmosphere of oxygen under pressure.

9. The process of treating milk or other liquid or semi-liquid food material for preservation, which comprises freeing the material to be preserved from the gases dissolved therein, forcing into the material oxygen under pressure, heating the material thus pretreated 4 to 8 hours in an oxygen atmosphere under a pressure ranging between 8 and 10 atmospheres above normal to a temperature ranging between about 50 and 65° C., allowing the material to cool down and storing same in a condition of permanent saturation with oxygen.

10. The process of treating milk or other liquid or semi-liquid food material for long-time preservation, which comprises freeing the material to be preserved from foreign gases dissolved therein, replacing these gases by oxygen, heating the material for that period of some hours sufficient to effect complete destruction of pathogenic organisms and substantially complete sterilization in an oxygen atmosphere under a pressure such that the quantity of oxygen present suffices to stifle bacterial life during more than a few days, to a temperature materially below that ordinarily used to bring about sterilization, cooling the material to atmospheric temperature and storing same in the atmosphere of oxygen under pressure at the temperature of the ambient air.

KARL RICHTER.